United States Patent [19]

Tannenbaum

[11] Patent Number: 5,079,073

[45] Date of Patent: Jan. 7, 1992

[54] NON-STICK COATING SYSTEM WITH THIN UNDERCOAT OF POLYAMIDE IMIDE

[75] Inventor: Harvey P. Tannenbaum, Philadelphia, Pa.

[73] Assignee: E.I. Du Pont de Nemours and Company, Wilmington, Del.

[21] Appl. No.: 396,590

[22] Filed: Aug. 21, 1989

[51] Int. Cl.$^5$ .................. B32B 7/02; B32B 27/08
[52] U.S. Cl. .................. 428/216; 428/419; 428/422; 428/423.5
[58] Field of Search .............. 428/421, 327, 422, 324, 428/332, 419, 212; 427/267; 148/6.16, 6.27, 251, 275; 523/218, 435, 210; 524/267, 508; 204/29

[56] References Cited

U.S. PATENT DOCUMENTS

| | | | |
|---|---|---|---|
| Re. 31,448 | 11/1983 | Attwood et al. | 428/422 |
| 2,562,118 | 7/1951 | Osdal | 148/251 |
| 3,801,379 | 4/1974 | Blackwell | 148/275 |
| 4,049,863 | 9/1977 | Vassiliou | 428/324 |
| 4,090,993 | 5/1978 | Attwood et al. | 524/508 |
| 4,118,537 | 10/1978 | Vary et al. | 428/422 |
| 4,123,401 | 10/1978 | Berghmans et al. | 523/210 |
| 4,131,711 | 12/1978 | Attwood | 428/332 |
| 4,139,576 | 2/1979 | Yoshimura et al. | 525/179 |
| 4,167,605 | 9/1979 | Attwood et al. | 428/419 |
| 4,177,320 | 12/1979 | Yoshimura et al. | 428/419 |
| 4,180,609 | 12/1979 | Vassiliou | 428/212 |
| 4,183,998 | 1/1980 | Vassiliou | 428/327 |
| 4,252,702 | 2/1981 | Wald | 523/435 |
| 4,252,859 | 2/1981 | Concannon et al. | 428/422 |
| 4,259,375 | 3/1981 | Vassiliou | 427/267 |
| 4,351,882 | 9/1982 | Concannon | 428/422 |
| 4,369,279 | 1/1983 | Emerick | 524/267 |
| 4,425,448 | 1/1984 | Concannon et al. | 523/218 |
| 4,818,350 | 4/1989 | Batzer | 204/29 |

FOREIGN PATENT DOCUMENTS

| | | |
|---|---|---|
| 887122 | 11/1971 | Canada . |
| 100889 | 2/1984 | European Pat. Off. . |
| 1512495 | 6/1978 | United Kingdom . |

OTHER PUBLICATIONS

PCT/EPO Search Report.

*Primary Examiner*—Thomas J. Herbert, Jr.
*Attorney, Agent, or Firm*—Richard H. Burgess

[57] ABSTRACT

Improved non-stick coating systems can be applied to untreated smooth substrate with a polyamide-imide undercoat 0.1–5.0 microns thick preferably containing colloidal silica and surfactant.

9 Claims, No Drawings

NON-STICK COATING SYSTEM WITH THIN UNDERCOAT OF POLYAMIDE IMIDE

BACKGROUND OF THE INVENTION

This invention relates to coatings systems, such as for cookware, which minimize sticking. More particularly, it relates to multilayer coating systems that can be used on smooth, untreated substrates.

Generally in the art a metal or glass substrate is roughened by some means before the first layer of coating is applied so that mechanical bonding will assist chemical adhesive means in holding the coating onto the substrate. Typical roughening means include acid etching, sand-blasting, grit-blasting, and baking a rough layer of glass, ceramic or enamel frit onto the substrate. The problem of adhesion of non-stick coatings to substrates is exacerbated by the nature of the coatings. If the coating is optimized for release to prevent food particles from sticking to it, easy clean-up after cooking, durability or to facilitate low friction sliding contact, almost by definition there will be difficulties in making it adhere well to the substrate.

The substrate can be metal, often aluminum or stainless steel used for cookware or industrial applications. It can be glass or ceramic. It might even be plastic for microwave oven cookware, or it could be an industrial article such as a saw made of carbon steel. Whatever the substrate or the application, if it is necessary to roughen the substrate to make the coating adhere, that at least adds cost and can cause other difficulties including creating a rough profile which can protrude or telegraph through the coating. This is especially undesirable when smoothness is sought, such as for saws and steam irons. The environmental cost of disposing of etchant materials can be significant. Sometimes, especially for glass and ceramic substrates, it also can cause unacceptable weakness or brittleness of the substrate.

Means of enhancing adhesion of non-stick coatings to a substrate are illustrated by the following patents.

U.S. Pat. No. 2,562,118-Osdal (1951) uses a mixture of phosphoric and chromic acids in a coating containing polytetrafluoroethylene (PTFE) for use directly on metal or glass. This can cause some inherent etching of the substrate. Better adhesion would be desirable.

U.S. Pat. No. 4,049,863 - Vassiliou (1977) teaches a primer containing fluoropolymer, such as PTFE, colloidal silica and a polyamide imide (PAI), along with other constituents, applied by various techniques to a substrate that is preferably pretreated by grit blasting, flame spraying of metals or metal oxides or frit coating, or to phosphated and chromated metals. The PTFE:-PAI ratio can be 1:9. The primer coat is ordinarily applied to a dry film thickness (DFT) of about 2-15 microns $\mu m$). After air drying, the primer is topcoated with a conventional fluoropolymer enamel and baked. (Parts, percentages and proportions herein are by weight except where indicated otherwise.)

Although U.S. Pat. No. 4,259,375 - Vassiliou (1981) teaches applying a decorative fluoropolymer coating on a primer which is applied directly to the substrate, the implication is that the usual roughened substrate is used.

U.S. Pat. No. 3,801,379 - Blackwell (1974) applies a poly(arylene sulfide) coating such as polyphenylene sulfide (PPS) directly to an aluminum substrate after treating the substrate with hot water or steam. Preferably the coating is done with the substrate at 455° C., causing flocking of the coating. The thickness of the coating is not disclosed, and the PPS can contain 5-20% PTFE.

Canadian 887,122—Fang (1971) provides a single coating of PAI and PTFE on a metal substrate with a concentration gradient from mostly PAI at the substrate to mostly PTFE at the air interface. This is applied as a single coat without any special primer on ordinary steel or sand-blasted aluminum.

British 1,512,495 (SEB) (1978) applies a PAI coating containing PTFE powder at a DFT of 5-100 microns to a metal or glass substrate that has been merely degreased and not roughened. The minimum ratio of PTFE:PAI is 1:7. This then is the undercoat on which a PTFE powder topcoat is applied. However, the PTFE in the undercoat at these thicknesses can lead to failure of intercoat adhesion.

European application 100,889—Gebauer (1984) describes thicker coatings containing certain perfluorocarbon resins, PPS, lithium hydroxide, and silica and asserts they are superior to prior art primer coatings on the order of 10 microns thickness. If the substrate is smooth, he teaches that it can be roughened by sand blasting or etching.

U.S. Pat. No. 4,177,320 and 4,139,576—both Yoshimura, et al, (1979) teach an undercoat of PPS or PPS plus PAI or polyimide with surface active agents on sand-blasted rough aluminum at a DFT of 15 or 20-25 microns. As in many of these patents, the need for roughening the substrate to obtain adequate adhesion and durability adds considerable costs.

Coatings systems including primers, intermediate and top coats useful with the present invention are described in various patents including:
- U S. Pat. No. 4,049,863 - Vassiliou (1977);
- U.S. Pat. No. 4,118,537 - Vary and Vassiliou (1978);
- U.S. Pat. No. 4,123,401 - Berghmans and Vary (1978);
- U.S. Pat. No. 4,252,859 - Concannon and Vary (1981);
- U.S. Pat. No. 4,351,882 Concannon (1982); all incorporated herein by reference.

SUMMARY OF THE INVENTION

The present invention, in certain of its embodiments, provides a coating system comprising a substrate, preferably of metal, glass or ceramic, with a multi-layer non-stick coating, comprising an undercoat, a primer, a topcoat and up to one or more intermediate coats, wherein:
- the substrate is free of contaminants that would prevent adhesion of the undercoat,
- the undercoat is applied to the substrate and consists essentially (on a weight basis after air drying but before baking) up to 8%, preferably about 3-8%, surfactant, up to 20%, preferably 10-20%, fine-particle silica, the balance polyamide imide, and has a dry film thickness in the range of 0.1-5.0 microns,
- the primer is applied to the undercoat and comprises perfluorocarbon resin and at least one of polyamide imide, polyarylene sulfide and polyether sulfone and has a dry film thickness in the range of 2-15 microns, and
- the topcoat comprises perfluorocarbon resin.

DETAILED DESCRIPTION

The present invention permits not only lower cost by avoiding the roughening of the substrate but also smoother coated surfaces which can be advantageous for release on cookware, and for the gliding effect on steam iron sole plates. Also it can allow elimination of costly polishing of coated copier roll surfaces and application of dispersion PTFE coatings by coil coating and roller coating techniques.

When coating systems otherwise according to the invention are attempted on smooth substrates without the required thin undercoat, the film can be removed too easily by ordinary crosshatch or finger-nail scratch tests. Also, when the undercoat is thicker than stated above, it tends to crack the midcoat and cause rippling of the topcoat. With use of the undercoat on smooth substrates, treated only by washing to remove grease and any other contaminants which might interfere with adhesion, coating systems of the invention give good food release and good resistance to usual durability tests such as the "tiger paw" cooking tests involving a weighted holder with multiple ball point pen shafts rotating around the inside of a frying pan during cooking tests. Satisfactory results are not obtained without the undercoat or with PTFE in the undercoat or with too thick an undercoat.

Typical prior art preparation of surfaces to enhance adhesion of a release coating has involved etching or sand or grit blasting to develop a surface profile. The profile measured in average microinches using a model RT 60 surface roughness tester made by Alpa Co. of Milan, Italy. The profile on typical rolled aluminum after washing to remove grease and contaminants is 16-24 microinches. The profile on steel varies more widely but is typically less than 50 microinches. On both steel and aluminum, before a release coating is applied the profile is increased to over 100 micro inches, preferably for aluminum for some uses to 180-220 micro inches. Thus, the present invention is particularly useful with steel or aluminum substrates having a profile of less than 100, preferably less than 50 micro inches.

In the following examples, the polyamide imide, colloidal silica and dispersions preferably are those of U.S. Pat. No. 4,049,863 - Vassiliou (1977); the PTFE blends are those of U.S. Pat. Nos. 4,252,859 and 4,351,883 - Concannon (1982); the ultramarine blue is that of U.S. Pat. No. 4,425,448 - Concannon and Rummel (1984); the polyether sulfone is that of U.S. Pat. No. 3,981,945 (1976), 4,090,993 (1978) - both Atwood et al, and 4,131,711 (1978) - Atwood, and the polyarylene sulfide is the polyphenylene sulfide of U.S. Pat. No. 4,287,112 (1981) - Berghmans.

EXAMPLE

An undercoat of polyamide imide, colloidal silica and surfactant are sprayed on smooth aluminum that has merely been washed to remove grease to a DFT of 0.1-5.0, preferably 0.25-2.5, preferably 1.25 microns. This undercoat is permitted to air dry, then a primer coat of polyamide imide, PTFE, colloidal silica, $TiO_2$-coated mica, pigmentation such as ultramarine blue, $TiO_2$ and other pigments, is sprayed onto the undercoat to a DFT of 2-15, preferably 5.0 to 7.5 microns and a topcoat is sprayed to a DFT of 15 to 18 microns (wet-on-wet) on the primer coat, containing PTFE, decomposable acrylic resin to aid in coalescence, and $TiO_2$-coated mica. The coating system is then baked at 149° C. for 10 minutes followed by 427° C. for 5 minutes. The substrate should be above 416° C. at least 3 minutes in a commercial operation where the thermal inertia of the substrate can cause slow heating. As is known in the art, DFT can be controlled by the time of spraying or by dilution, and other application techniques such as roller coating can be used.

The thicknesses of the undercoat and the primer coat are both important to avoid loss of intercoat adhesion. The thickness of the topcoat and optional intermediate coats is preferred but can be varied. Thicker topcoats under some circumstances can give improved performance. The primer coat weight ratio of PTFE to PAI preferably is in the range of 2:1 to 7:1 with about 4:1 most preferred.

The following tables show the formulations for these layers.

| | UNDERCOAT | |
|---|---|---|
| | % by weight | |
| Ingredient | (wet basis) | (air dry before baking and range) |
| furfuryl alcohol | 2.4 | — |
| polyamide imide solution AI-10 from Amoco | 26.02 | 78.74 (balance) |
| deionized water | 66.48 | — |
| colloidal silica Ludox AM from Du Pont | 4.60 | 15.86 (10-20) |
| surfactant Triton X100 from Rohm & Haas Co. | 0.5 | 5.4 (3-8) |
| TOTAL | 100.00 | 100.00 |

| PRIMER | |
|---|---|
| Ingredient | % by weight (wet basis) |
| furfuryl alcohol | 1.85 |
| polyamide imide solution | 18.09 |
| deionized water | 52.01 |
| $TiO_2$-coated mica flake "Afflair" from Merck | 0.06 |
| PTFE dispersion T-30 from Du Pont | 20.95 |
| colloidal silica | 3.62 |
| ultramarine blue pigment 53% solids dispersed in water | 3.15 |
| red iron oxide pigment 45% solids dispersed in water | 0.27 |
| TOTAL | 100.00 |

TOPCOAT

The preferred topcoat is that of example 1 of U.S. Pat. No. 4,118,537.

When these coatings are applied as described to smooth degreased cookware aluminum, stainless steel and other metals, they give acceptable crosshatch and fingernail adhesion test results and are as good as or better than a commercial 2-coat system applied to aluminum grit blasted to a profile of 180-220 microinches in terms of release of food, staining, blister resistance in cooking, and tiger paw testing for durability.

Alternatively, the coats above the undercoat and primer (topcoat and optional intermediate coats) can be those of U.S. Pat. No. 4,252,854; 4,351,882; and 4,425,448, and combinations thereof. Also the thin undercoat of the invention can also be used on substrates roughened in various ways known in the art to make coating systems even better than without such undercoats.

I claim:

1. A coated substrate comprising a substrate with a multi-layer non-stick coating, comprising an undercoat, a primer, and a topcoat, and up to one or more intermediate coats between the primer and the topcoat, wherein:

the substrate is free of contaminants that would prevent adhesion of the undercoat, the undercoat is applied to the substrate and consists essentially of (on a weight basis after air drying but before baking) up to 8% surfactant, up to 20% fine-particle silica, the balance polyamic acid or polyamide imide, and has a dry film thickness in the range of 0.1–5.0 microns, the primer is applied to the undercoat and comprises perfluorocarbon resin and at least one of polyamic acid or polyamide imide, polyarylene sulfide and polyether sulfone and has a dry film thickness in the range of 2–15 microns, and the topcoat comprises perfluorocarbon resin.

2. The coated substrate of claim 1 wherein the coating comprises at least one intermediate coat containing the ingredients of the primer.

3. The coated substrate of claim 1 wherein, before application of the undercoat, the surface of the substrate has been treated to remove contaminates that would interfere with adhesion but has not been etched or mechanically roughened.

4. The coated substrate of claim 1 wherein the substrate is metal selected from aluminum, stainless steel and carbon steel.

5. The coated substrate of claim 4 wherein the substrate before coating has a surface roughness profile less than 100 micro inches.

6. The coated substrate of claim 4 wherein the substrate before coating has a surface roughness profile less than 50 micro inches.

7. The coated substrate of claim 1 wherein the undercoat contains 10–20% fine-particle silica and 3–8% surfactant.

8. The coated substrate of claim 7 wherein the undercoat has a dry film thickness of 0.25–2.5 microns.

9. The coated substrate of claim 8 wherein the primer has a dry film thickness of 5.0–7.5 microns.

* * * * *